(12) United States Patent
Goyal et al.

(10) Patent No.: US 11,755,637 B2
(45) Date of Patent: Sep. 12, 2023

(54) MULTI-ATTRIBUTE CONTROL FOR TEXT SUMMARIZATION USING MULTIPLE DECODER HEADS

(71) Applicant: salesforce.com, inc., San Francisco, CA (US)

(72) Inventors: Tanya Goyal, Austin, TX (US); Wojciech Kryscinski, Palo Alto, CA (US); Nazneen Rajani, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/572,549

(22) Filed: Jan. 10, 2022

(65) Prior Publication Data

US 2023/0065155 A1   Mar. 2, 2023

Related U.S. Application Data

(60) Provisional application No. 63/235,544, filed on Aug. 20, 2021.

(51) Int. Cl.
*G06F 16/34*   (2019.01)
*G06F 40/166*   (2020.01)
*G06N 3/02*   (2006.01)
*G06N 7/01*   (2023.01)

(52) U.S. Cl.
CPC .......... *G06F 16/345* (2019.01); *G06F 40/166* (2020.01); *G06N 3/02* (2013.01); *G06N 7/01* (2023.01)

(58) Field of Classification Search
CPC .................................................... G06F 16/345
See application file for complete search history.

(56) References Cited

U.S. PATENT DOCUMENTS

| | | | | |
|---|---|---|---|---|
| 6,006,181 | A  * | 12/1999 | Buhrke | G10L 15/30 |
| | | | | 704/231 |
| 2009/0228238 | A1 * | 9/2009 | Mansinghka | G06N 7/04 |
| | | | | 702/181 |
| 2019/0278835 | A1 * | 9/2019 | Cohan | G06F 16/93 |
| 2019/0287012 | A1 * | 9/2019 | Celikyilmaz | G06N 3/0445 |
| 2019/0384810 | A1 * | 12/2019 | Huang | G06N 7/005 |
| 2020/0175229 | A1 * | 6/2020 | Iwakura | G06N 7/005 |
| 2020/0311350 | A1 * | 10/2020 | Makino | G06F 40/242 |
| 2020/0364543 | A1 * | 11/2020 | Luong | G06N 3/045 |
| 2021/0374338 | A1 * | 12/2021 | Shrivastava | G06F 40/56 |
| 2022/0301295 | A1 * | 9/2022 | Livet | G06V 10/764 |

FOREIGN PATENT DOCUMENTS

WO    WO-2020253947 A1 * 12/2020 ........... G06N 3/0445

* cited by examiner

*Primary Examiner* — Asher D Kells
(74) *Attorney, Agent, or Firm* — Haynes and Boone, LLP (57) ABSTRACT

The decoder network includes multiple decoders trained to generate different types of summaries. The lower layers of the multiple decoders are shared. The upper layers of the multiple decoders do not overlap. The multiple decoders generate probability distributions. A gating mechanism combines the probability distributions of the multiple decoders into a probability distribution of the decoder network. Words in the summary are selected based on the probability distribution of the decoder network.

20 Claims, 6 Drawing Sheets

Input Article: Insights into the workings of the human body that Leonardo da Vinci could only obtain by dissecting scores of corpses and recording the results in exquisite drawings will be displayed for the first time beside modern 3D films, CT and MRI scans, which show how close the Renaissance genius got to the truth of what lies under the skin [...] the Edinburgh show will be the the first to compare Leonardo's results with the best results of modern technology [...] The exhibition will show how close Leonardo got in some of his last medical experiments to discovering the role of the beating heart in the circulation of the blood, a century before William Harvey worked it out. [...]

Reference Summary: Royal Collection exhibition in Edinburgh will show how accurate Renaissance polymath's sketches were.

← 140

Baseline BART ← 502

Edinburgh show will be first to compare Renaissance genius's results with best results of modern technology
Edinburgh show will be first to compare Renaissance genius's results with the best results of modern technology
Edinburgh show will be first to compare Leonardo's results with the best results of modern technology Low diversity

HYDRASUM

Edinburgh show will be first to compare Leonardo's results with best results of modern technology. ← 504

Edinburgh show will be first to compare Leonardo da Vinci's results with the best results of modern technology, including 3D films, CT and MRI scans. ← 506

Modern imaging techniques will be displayed alongside Leonardo da Vinci's anatomical drawings in Edinburgh exhibition. ← 508

Extractive
Shorter Length
Less Specific

Content Fusion
Longer Length
More Specific

Abstractive
Longer Length
More Specific

MULTI-ATTRIBUTE CONTROL FOR TEXT SUMMARIZATION USING MULTIPLE DECODER HEADS

CROSS-REFERENCE TO RELATED APPLICATIONS

This application claims priority under 35 U.S.C. § 119 to U.S. Provisional Application No. 63/235,544, filed Aug. 20, 2021, which is hereby expressly incorporated by reference herein in its entirety.

TECHNICAL FIELD

The embodiments are directed to summarizing text using summarization models, and more specifically to a decoder neural network in a summarization model that generates a diverse set of summaries.

BACKGROUND

Generating an abstract summary of a text involves different decisions. These decisions include whether to copy content directly from the input document, whether to paraphrase content, the level of specificity and/or generality of the summary, the length of the summary, readability of the summary, etc. Current summarization systems implicitly encode these decisions as parameters, but do not provide a mechanism for users to control the parameters to obtain a diverse set of summaries for a given input. Commonly used sampling methods such as beam search, top-k decoding or diverse decoding tend to output stylistically similar summaries. These sampling methods also cannot be queried to generate multiple diverse summaries satisfying a target set of features or styles.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The embodiments are directed to a summarization model that receives input, such as a text or document, and generates a diverse set of summaries of the input. The summarization model includes an encoder, such as a single transformer-based encoder to encode the input and a mixture-of-experts framework with multiple decoders for summary generation.

The summarization model receives input and generates a summary over a series of time steps. The summary may include multiple tokens, with each token being a word. At each time step of the summary generation phase, each decoder computes a probability of the next token being included in the summary. The summarization model computes next token's probability distribution by combining the probability distributions generated by each decoder. Multiple decoders allow the summarization model to distribute the diverse stylistic and lexical features encountered in the training data, even those within the same reference summary, and across parameters of the separate decoders. For example, a summarization framework may include two decoders. The first decoder may learn to copy phrases or words from an input document. The second decoder may learn to paraphrase and make syntactic transformations. While the individual decoders cannot cover the range of stylistic variations in the dataset, a weighted combination or mixture of the two decoders can be used to model the summarization dataset.

In some embodiments, a summarization model may be trained using unguided and guided settings. In the unguided setting, the summarization model does not explicitly control the partitioning of the summary features. In the guided setting, different decoders are trained to learn contrasting summary styles along one specific feature, such as low abstractiveness or high abstractiveness. The experiments on three summarization datasets called the CNN, NEWSROOM, and XSUM datasets, illustrate that the summarization model generates summaries that have significantly better stylistic diversity and improvement in the top-K quality as compared to baseline models, such as a Bidirectional and Auto-Regressive Transformers (BART) model. Moreover, the multiple decoders in the summarization model allow for sampling from any combination of available decoders which translates into flexile summaries.

Figure 1:
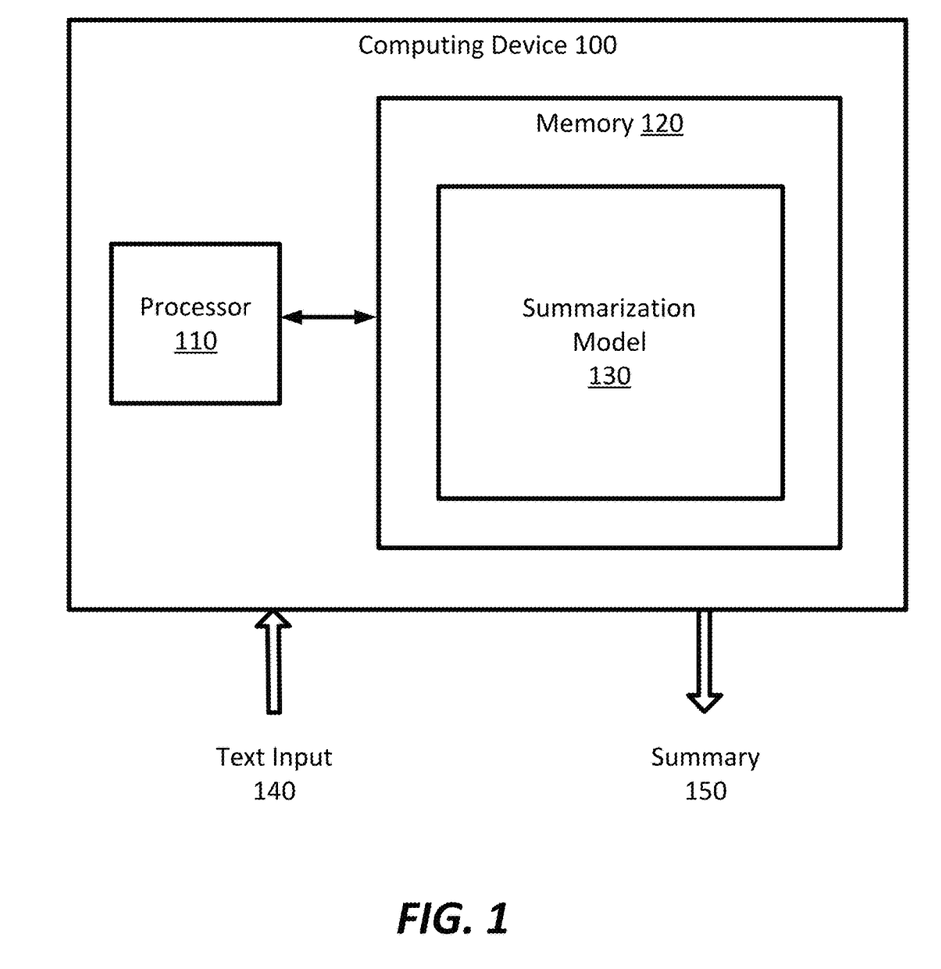
FIG. 1 is a simplified diagram of a computing device for implementing a summarization model, according to some embodiments.

FIG. 1 is a simplified diagram of a computing device 100, according to some embodiments. The computing device 100 includes a processor 110 coupled to memory 120. Operation of computing device 100 is controlled by processor 110. Although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include a non-transitory, tangible, machine readable media that includes executable code that when run by one or more processors (e.g., processor 110) may cause the one or more processors to perform the methods described in further detail herein. Memory 120 stores a summarization model 130. Summarization model 130 receives text input 140, such as an article, a document, etc., and generates a summary 150 of the text input 140. Summary 150 may be, for example, an abstract of the article or a document or another type of text input 140.

Figure 2:
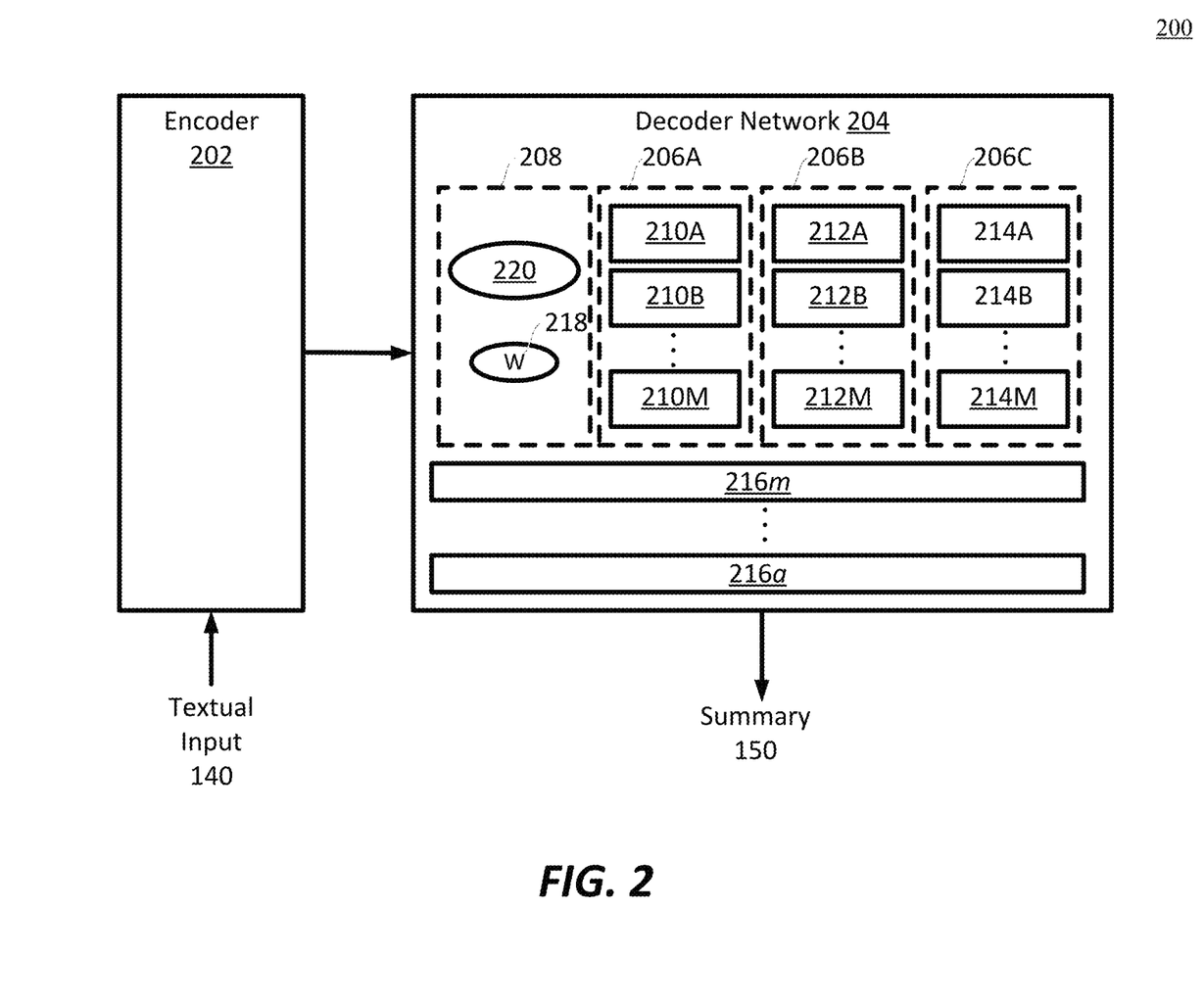
FIGS. 2 and 3 are simplified diagrams of a summarization model, according to some embodiments.

FIG. 2 is a block diagram 200 of a summarization model, according to some embodiments Summarization model 130 includes an encoder 202 and a decoder network 204. Encoder 202 may be a transformer-based encoder. Encoder 202 may receive input, such as text input 140 and encode the input into encodings. Decoder network 204 may receive the encodings and generate summary 150. In some embodiments, summarization model 130 may generate summary 150 over multiple iterations or time steps, and generate a word or token for inclusion in summary 150 at each iteration.

Encoder 202 and decoder network 204 may be neural networks. Decoder network 204 may include network multiple decoders $\varphi_1, \varphi_2, \ldots \varphi_k$. There may be a k number of decoders, where k is an integer. FIG. 2 illustrates decoder network 204 with three decoders 206A-C for k=3. The multiple decoders 206A-C may also be referred to as generation heads, which are different from multiple heads of the attention layers.

Summarization model 130 may generate words over a time period comprising multiple time steps. At each time step, each decoder 206A-C may output a probability distribution $P_{\varphi_k}(\psi_i | x, \psi_{<i})$ over the vocabulary, corresponding to the next-token probabilities. The final output probability $P(\psi_i | x, \psi_{<i})$ is computed as a mixture of the k probability distributions of decoders 206A-C, with the mixing coefficients or weights predicted by a gating mechanism G (shown as 208). The weights specify the contribution of the probability distribution $P_{\varphi_k}(\psi_i | x, \psi_{<i})$ from each decoder 206A-C in the next token or word included in the summary 150.

Each one of decoders 206 may be divided into M decoder blocks or layers that include layers specific to decoders 206 and shared layers. M may be an integer, such as M=12. As illustrated in FIG. 2, decoder 206A may be divided into layers 210A-M, decoder 206B may be divided into layers 212A-M, and decoder 206C may be divided into layers 214A-M. Layers 210A-M, 212A-M and 214A-M are layers specific to the corresponding decoders 206A-C. Decoders 206 may also have shared layers that are common to decoders 206. In other words, parameters of the m (<M) bottom-most layers may be shared among the k decoders. FIG. 2 illustrates that decoders 206A-C share a number of bottom layers, such as layers 216a-m. This reduces the number of extra parameters introduced into the architecture of the decoder network 204. In some embodiments, layers M for decoder 206A may include layers 210A-M and layers 216a-m, layers M for decoder 206B may include layers 212A-M and layers 216a-m, and layers M for decoder 206C may include layers 214A-M and layers 216a-m. The top M-m layers of decoders 206A-C are independent from each other and are independently grained. The top M-m layers of decoders 206A-C do not overlap with each other.

During the training phase, the text input 140, which may be article x and reference summary y are tokenized and fed into the encoder 202 and decoder network 204 respectively. The encodings from article x are fed into the decoder network 204.

The gating mechanism 208 may be included in decoder network 204. The gating mechanism 208 includes a feed forward layer 218 and a softmax layer 220. In the gating mechanism, let $h_i^m$ be the hidden state output of the $m^{th}$ decoder layer (layer 216m) at time step i. The $m^{th}$ layer 216 is the last shared layer between the decoders 206A-C. The hidden state output $h_i^m$ may be fed through a feed forward layer W (218) and the softmax layer 220. The size of the feed forward layer 218 may be size=[|$h_i^m$|, k]. The softmax layer 220 receives the output of the feed forward layer 228 and outputs the probability distribution $g_i$ of selecting specific decoders 206A-C for word generation. The probability distribution $g_i$ is used to compute the overall next-token output probability over a vocabulary and is computed as follows:

$$P(\psi_i | x, \psi_{<i}) = \Sigma_{j=1:k} g_i^j * P_{\varphi_k}(\psi_i | x, \psi_{<i}) \quad (1)$$

where k corresponds to the number of decoders, $g_i^j$ corresponds to the probability of selecting the $j^{th}$ decoder at time step i. The word or token that corresponds to the probability of the $j^{th}$ decoder 206 is included in summary 150.

Figure 3:
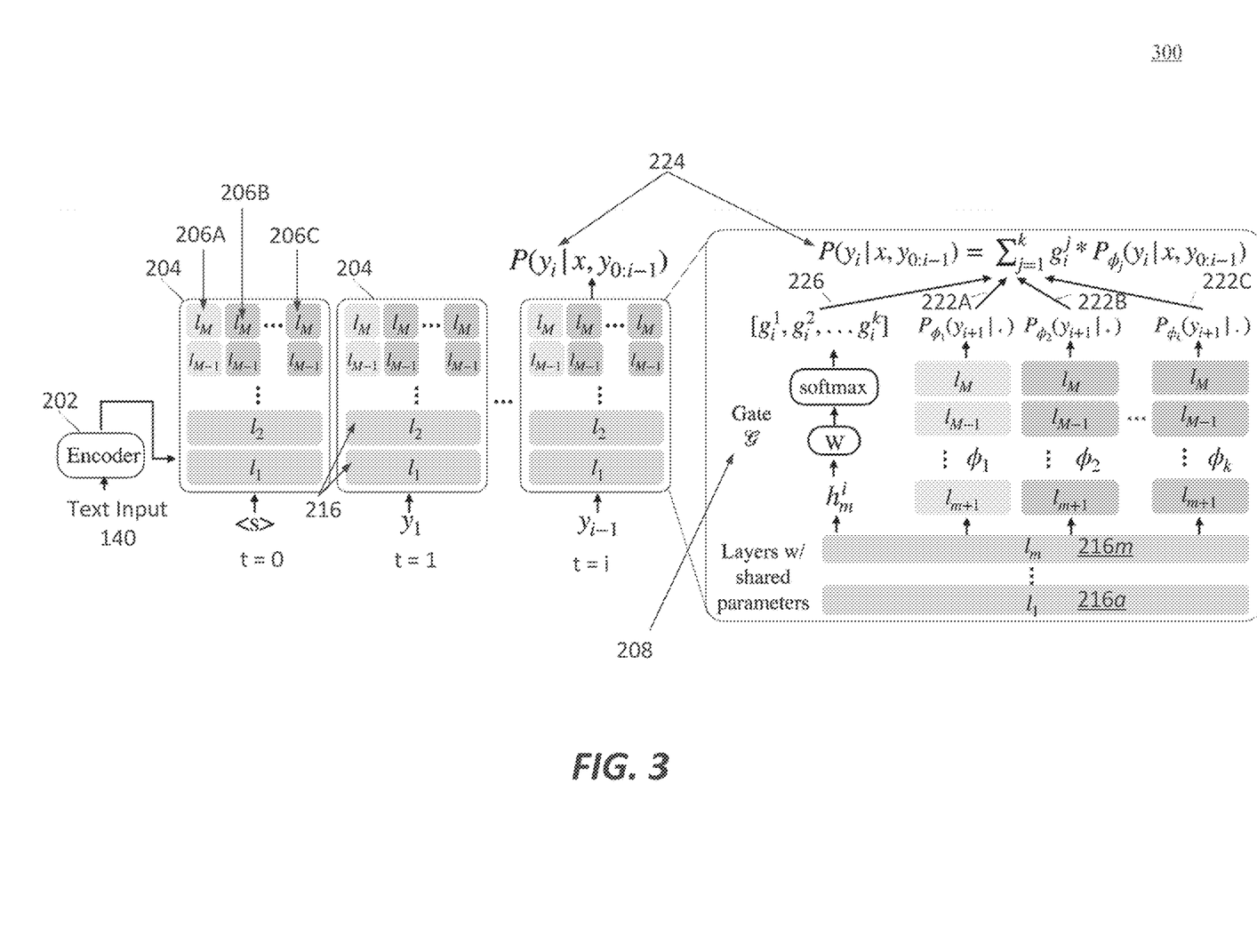

FIG. 3 is a block diagram 300 of a summarization model generating words over multiple iterations, according to some embodiments. As illustrated in FIG. 3, summarization model 130 includes encoder 202 and decoder network 204. Encoder 202 may receive input, such as text input 140 and encode the input into encodings. Decoder network 204 may receive the encodings and generate a word or a token at each iteration. FIG. 3 illustrates decoder network 204 during three iterations, labeled t=0, t=1, through t=i, where i is an integer. At t=1, encoder 202 receives text input 140 and generates encodings. The decoder network 204 receives the encodings and generates a token that is included in summary 150, which is shown as token $\psi_1$. At t=2, decoder network 204 receives the encodings and tokens from a previous time steps, that is token $\psi_1$ generated at time t=1, and generates token $\psi_2$. At t=i, decoder network 204 receives the encodings and tokens from a previous time steps, that is tokens $\psi_{1-1}$ and generates token $\psi_i$. As discussed above, token $\psi_1, \psi_2$, through $\psi_{i-1}$ may be generated using a probability 224 over a vocabulary as computed using Equation (1). As discussed above, probability 224 is a sum of the probability distributions 222A-222C of decoders 206A-206C.

During the training stage, the summarization model 130 may be trained to minimize the cross entropy loss of the reference summaries conditioned on the input document, such as text input 140. The loss may be determined as follows:

$$\text{loss} = -\Sigma_i \log P(y_i | x, \psi_{<i}) \quad (2)$$

Figure 4A:
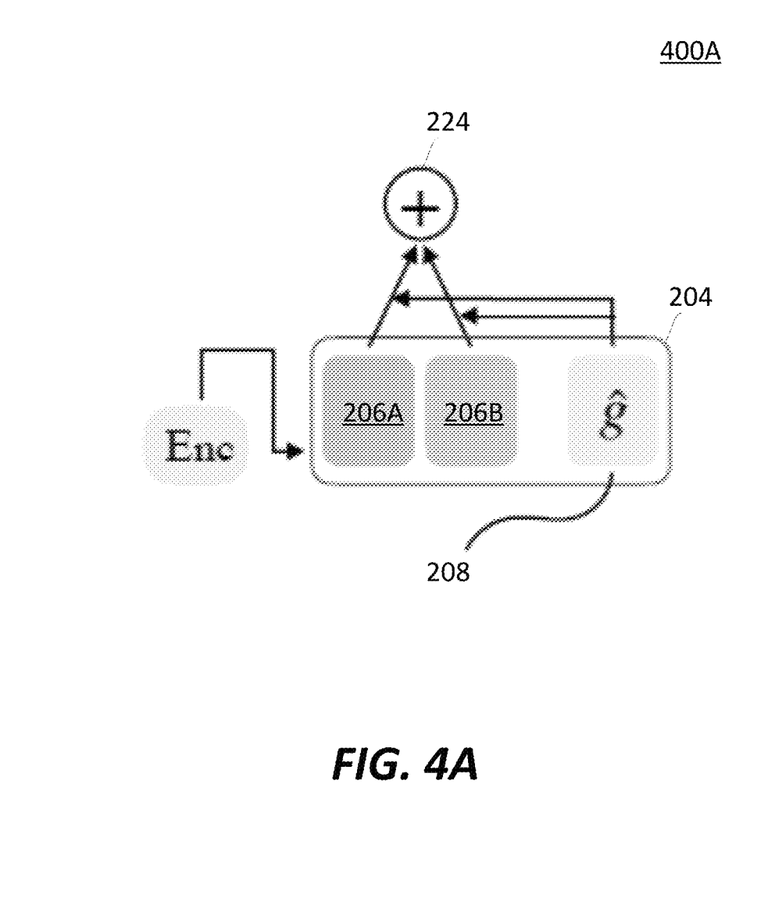
FIGS. 4A and 4B are block diagrams of gating mechanisms, according to some embodiments.

The gating mechanism 208 may be trained using unguided training and guided training. FIG. 4A is a block diagram 400A of a summarization model being trained using unguided training, according to some embodiments. FIG. 4A illustrates gating mechanism 208 in the decoder network 204. During the unguided training, neither summarization model 130 nor decoder network 204 provide additional supervision to the gating mechanism 208. Instead, the summarization model 130 implicitly decides the contribution of each decoder, such as decoder 206A and 206B to the final output probability 224, i.e. $g_i^j$ for decoder j, using the gating mechanism 208. This mixture based formulation, e.g. assigning different contributions to different decoders 206 in decoder network 204, allows summarization model 130 to assign contrastive summary styles to different decoders 206A-B as well as learn from infrequent examples in the dataset.

Figure 4B:
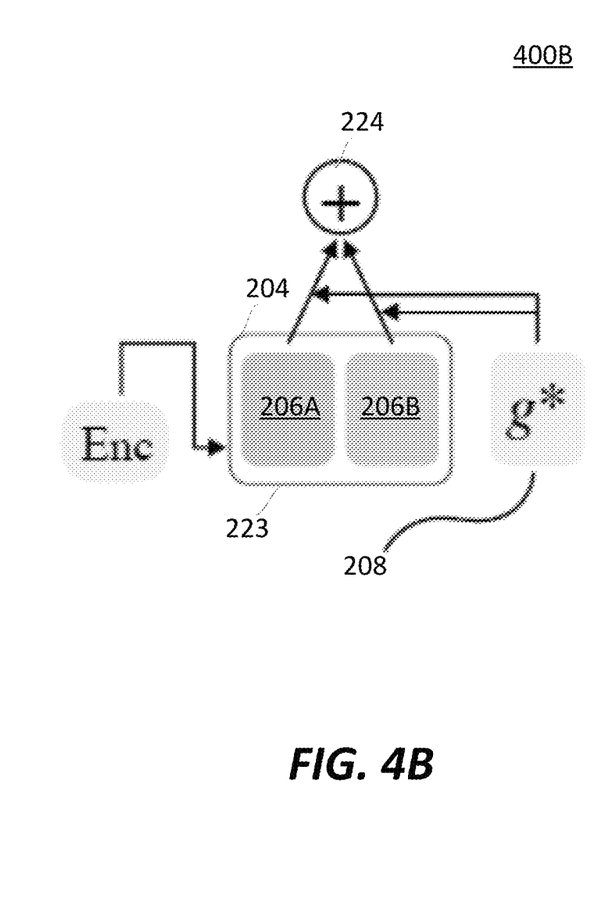

FIG. 4B is a block diagram 400B of a summarization model being trained using guided training, according to some embodiments. In the guided training, the gating mechanism 208 guides summary features that are partitioned between different decoders 206A-B. For example, given a stylistic feature, decoder network 204 with, e.g. two decoders 206A and 206B, may generate summaries 150 that vary substantially along a style. For example, suppose a stylistic feature is set so that decoder 206A generates summaries having low specificity and decoder 206B generates summaries having high specificity. In this case, the training data is partitioned based on specificity of the reference summary or sentence. Then, let $g \in [0,1]$ denote specificity. Next, instead of using the gating mechanism 208 during training, the oracle label g may derive the mixture coefficients [1−g, g]. In this way, the oracle label g may be used to decide the contribution of each decoder to the final output probability and loss computation. The loss computation may be determined as follows:

$$\text{loss} = -\Sigma_i \log[(1-g)*P_{\varphi_0}(\psi_i|x, \psi_{<i}) + g*P_{\varphi_1}(\psi_i|x, \psi_{<i}]] \quad (3)$$

In this case, if g=0, the first decoder may determine the summary 150, and if g=1, the second decoder may determine the summary 150. By setting $g \in [0,1]$, summarization model 130 may be trained using a mixture of decoders to denote mid-level specificity.

Going back to FIG. 3, once summarization model 130 is trained, summarization model 130 generates summaries 150 from text input 140, e.g. an article, document, etc., during the inference phase. The summaries 150 may be generated over a series of time steps. The gating mechanism 208 provides for several options, inference strategies, etc., to generate diverse summaries 150. This is because the gating mechanism 208 in the decoder network 104 provides several options for output probability distributions which differ in how the mixture weights are obtained.

In an inference strategy with individual decoders 206, summarization model 130 generates summaries using selected $j^{th}$ decoder, such as decoder 206A, 206B or 206C in FIG. 3. In this strategy, summarization model 130 overrides the output vector 226 of the gating mechanism using vector: [0,0, ..., 1, ..., 0] where a value that corresponds to the selected $j^{th}$ decoder is $g^j=1$ and values that correspond to the other decoders 206 are set to =0 for all time steps. The vector is then applied to the probability distributions 222 of corresponding decoders 206, such as probability distributions 222A, 222B, and 222C. Because probability distribution 222 of only the $j^{th}$ decoder that corresponds to $g^j=1$ may generate a non-zero value, the probability 224 has contribution only from the $j^{th}$ decoder. As such the next token will correspond to the probability of the $j^{th}$ decoder.

In an inference strategy with multiple decoders 206A-B, the gating mechanism 208 generates vector 226 that includes a mixture of weights. The weights indicate a contribution of probability distributions 222A-C generated by decoders 206A-C to the probability 224 generated by the decoder network 204. The weights in vector 226 may have values between zero and one. The weights may be generated by passing the hidden state $h_i^m$ that is the output of the last shared layer 216m through feed forward layer 218 and the softmax layer 220. The vector 226 for decoder $\varphi_j$ may be $g_i^j = (W^T h_i^m)_j$ at time step t.

In an inference strategy that uses a manually specified vector 226, summarization model 130 may receive an input from a user identifying values for vector 226, which may control sampling from decoders 206A-C. For example, suppose decoder 206A is trained to learn abstractive features and decoder 206B is trained to learn extractive features. Summarization model 130 may control the degree of abstraction in the generated summaries 150 by sampling the probability distributions 222A and 222B using different values for vector 226, such as [1−g,g]. For example, given a user specified distribution vector 226 of [0.3, 0.7], the output probabilities for decoders 206A and 206B may be as follows:

$$P(\psi_i|\cdot) = 0.3*P_{\varphi_0}(\psi_i|\cdot) + 0.7*P_{\varphi_1}(\psi_i|\cdot) \quad (4)$$

Figure 5:
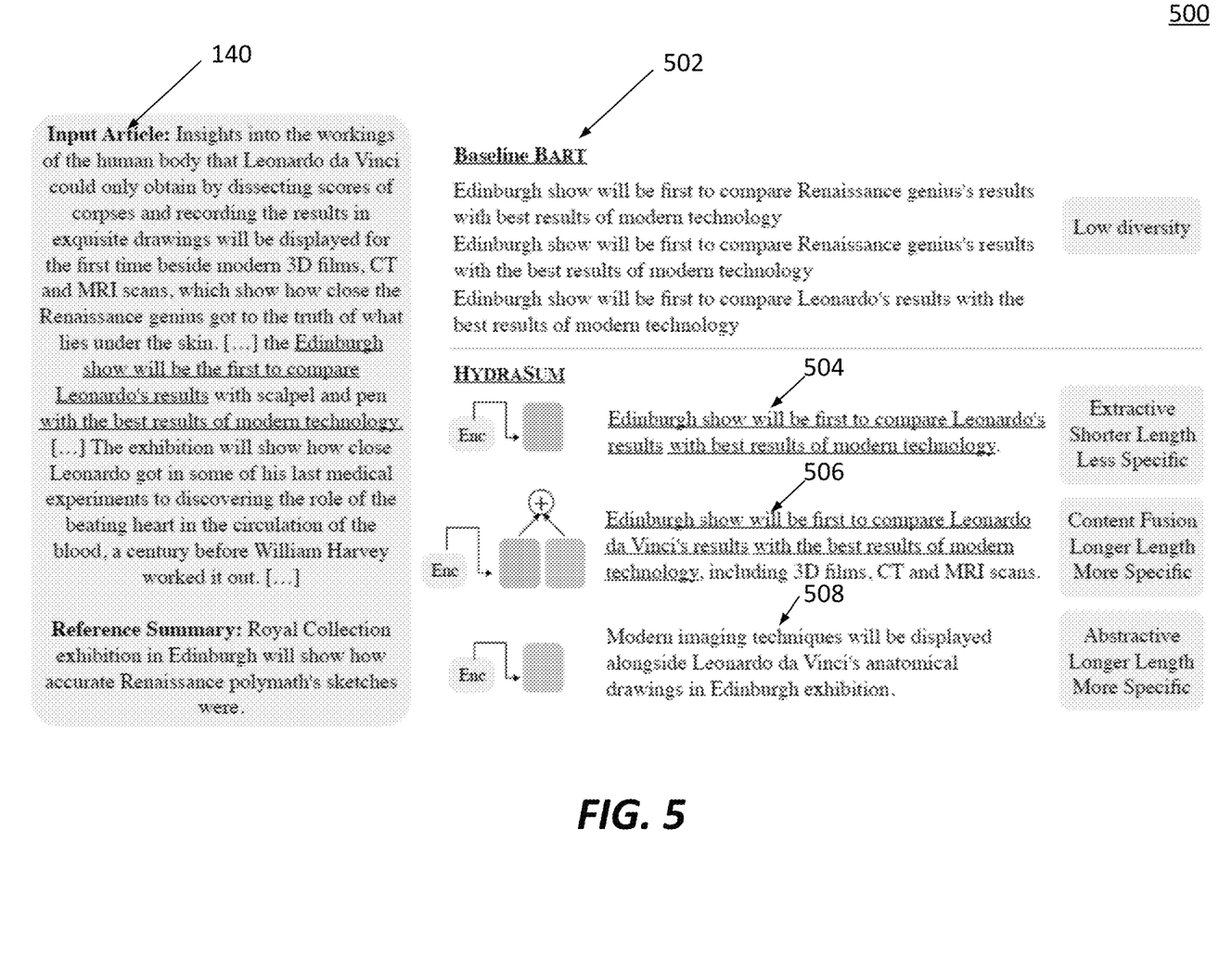
FIG. 5 is a diagram illustrating different summaries generated using a summarization model and a conventional Bidirectional and Auto-Regressive Transformers (BART) model, according to some embodiments.

FIG. 5 is a diagram 500 illustrating different summaries generated using a summarization model and a conventional BART model, according to some embodiments. As illustrated in FIG. 5, summarization model 130 and a conventional baseline BART model receive text input 140 that is an article. While the baseline BART model generates three abstracts 502 that have low diversity and similar length, summarization model 130 with decoder network 204 that has two decoders 206 and a gating mechanism 208 generates three abstracts 504, 506, and 508 that have various diversities and various lengths. In summarization model 130 that generates abstracts 504, 506, and 508, one of the two decoders 206 is trained as an extractive decoder, while the other decoder in decoders 206 is trained as an abstractive decoder. Summarization model 130 generates abstract 504 using an inference strategy that selects output from only an extractive decoder, abstract 508 using an inference strategy that selects output from only an abstractive decoder, and abstract 506 using a mixture of the two decoders. As illustrated in FIG. 5, abstract 504 is shorter in length and is less specific, abstract 506 is longer in length, and is more specific, and abstract 508 is longer in length and is more specific. Additionally, abstracts 504 and 506 include text that is copied, in whole or in part from the article, while abstract 508 is more general text that paraphrases the article.

Figure 6:
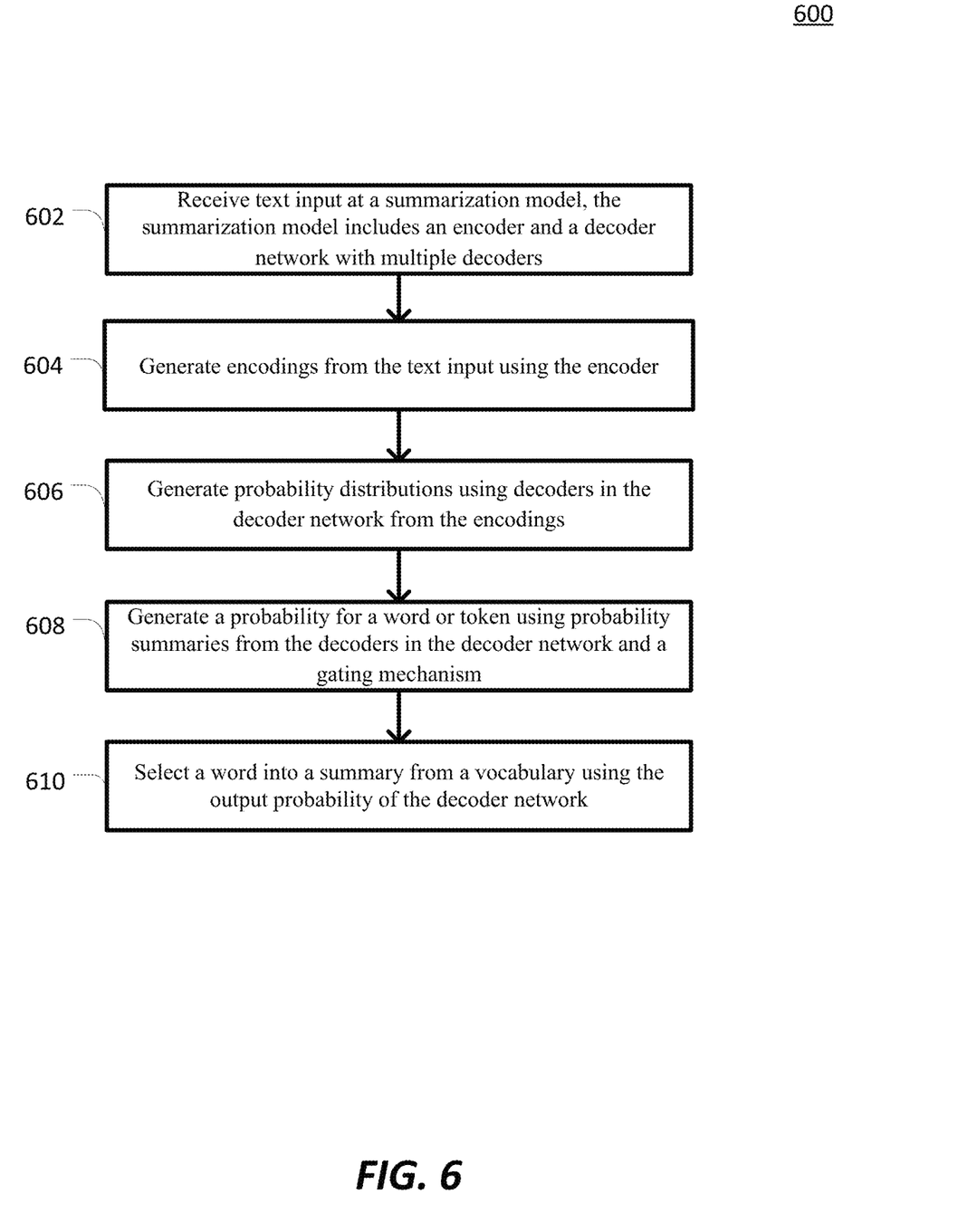
FIG. 6 is a flowchart of a method for generating a summary from a text input, according to some embodiments.

FIG. 6 is a simplified diagram of a method 600 for using a summarization model to generate a summary from a text input, according to some embodiments. One or more of the processes 602-612 of method 600 may be implemented, at least in part, in the form of executable code stored on non-transitory, tangible, machine-readable media that when run by one or more processors may cause the one or more processors to perform one or more of the processes 602-612.

At process 602, a text input 140, such as an article, is received at summarization model 130 that includes encoder 202 and decoder network 204 with multiple decoders 206. As discussed above, decoders 206 may share a pre-defined number of bottom layers, such as layers 216a-216m, and have non-overlapping and distinct top layers, such as respective layers 210A-M, 212A-M, and 214A-M in the corresponding decoders 206A-C. Additionally, decoder network 204 may include a gating mechanism 208 that shares shared layers 216a-216m with decoders 206.

At process 604, encodings are generated from the text input. For example, text input 140 is tokenized and fed into an encoder 202 of summarization model 130 to generate encodings.

At process 606, encodings are fed into a decoder network 204 of the summarization model 130 to generate probability distributions. For time steps other than the first time step, the output token or tokens of the decoder network 104 is also fed as input into decoder network 104 for the subsequent iteration together with the encodings. The encodings and the output from the previous time step are passed through the shared layers 216*a-m* and individual layers of decoders 206, such as layers 210A-M of decoder 206A, layers 212A-M of decoder 206B, and layers 214A-M of decoder 206C to generate probability distributions 222A-222C.

At process 608, a probability of a word or token is generated from the probability distributions using a gating mechanism. For example, using an unguided strategy, gating mechanism 208 may determine gating vector 226 which identifies weights with indicate a contribution of a probability distributions 222A-C of each decoder 206A-C to probability 224 of a next-token in summary 150. The contributions of each probability distribution 222A-C are then added into probability 224 from which a word or a token is determined. In another example, using a guided strategy, gating mechanism 208 may determine whether to determine a word or token for inclusion into summary from one of decoders 206A-C. In yet example, using a guided strategy, gating vector 226 may include user input which specifies a contribution of a probability distribution of each decoder 206A-C to the next-token or word in summary 150.

At process 610, a word in a vocabulary is selected based on the probability distribution as the word or token for the summary 150.

Processes 604-612 may repeat over multiple time steps until summary 150 is generated.

Some examples of computing devices, such as computing device 100 may include non-transitory, tangible, machine readable media that include executable code that when run by one or more processors (e.g., processor 110) may cause the one or more processors to perform the processes of method 600. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for generating a summary, the method comprising:

receiving, at a summarization model, a text input, the summarization model including an encoder and a decoder network, the decoder network including multiple decoders, wherein a decoder in the multiple decoders includes a first plurality of layers that are shared with other decoders in the multiple decoders and a second plurality of layers that are not shared with the other decoders;

generating, using the encoder, encodings from the text input;

generating, using the multiple decoders, probability distributions from the encodings;

receiving, at a gating mechanism, a hidden state, wherein the hidden state is an output of the first plurality of layers that are shared with the other decoders;

generating, using the gating mechanism, gating probability distributions from the hidden state;

combining, the probability distributions and the gating probability distributions into a probability of the decoder network associated with at least one word; and selecting, using the probability of the decoder network, the at least one word for inclusion in the summary of the text input.

2. The method of claim 1, the combining further comprises:

applying weights associated with the gating probability distributions to the probability distributions associated with multiple decoders; and generating the probability of the decoder network by adding the weighted probability distributions.

3. The method of claim 1, wherein the combining further comprises:

determining, using the gating probability distributions, a probability distribution of the decoder in the decoder network, wherein the probability of the decoder network is the probability of the decoder.

4. The method of claim 1, further comprising:

receiving, at the gating mechanism, user input indicating weights, the weights indicating contributions of the probability distributions of the multiple decoders; and wherein the combining further includes combining, using the gating mechanism, the probability distributions into the probability of the decoder network according to the weights.

5. The method of claim 1, further comprising:

training a first decoder in the multiple decoders to generate summaries having a first abstractive property; and training a second decoder in the multiple decoders to generate summaries having a second abstractive property, different from the first abstractive property.

6. The method of claim 5, further comprising:
receiving an input identifying the first abstractive property and the second abstractive property; and
wherein the combining further comprises combining, using the gating mechanism, a probability distribution associated with the first decoder trained using the first abstractive property and a probability distribution associated with the second decoder trained using the second abstractive property.

7. The method of claim 1, wherein the first plurality of layers that are shared with the other decoders are a configurable number of lower layers, and the second plurality of layers that are not shared with the other decoders are upper layers.

8. The method of claim 7, wherein generating the probability distributions from the encodings further comprises:
passing the encodings through the first plurality of layers to generate the hidden state[s];
passing the hidden state[s] through upper layers of the decoder to generate a first probability distribution in the probability distributions; and
passing the hidden state[s] through upper layers of a second decoder in the other decoders to generate a second probability distribution in the probability distributions.

9. The method of claim 1, wherein the gating mechanism comprises a feed forward layer and a softmax layer.

10. The method of claim 9, further comprising:
passing the encodings through the first plurality of layers that are shared with the other decoders to generate the hidden state[s]; and
passing the hidden state[s] through the feed forward layer and the softmax layer of the gating mechanism to generate the gating probability distributions.

11. A system for generating a summary, the system comprising:
a memory configured to store a summarization model; and
a processor coupled to the memory and configured to:
receive, at a summarization model, a text input, the summarization model including an encoder and a decoder network, the decoder network including multiple decoders and a gating mechanism, wherein a decoder in the multiple decoders includes a first plurality of layers that are shared with other decoders in the multiple decoders and a second plurality of layers that are not shared with the other decoders;
generate, using the encoder, encodings from the text input;
generate, using the multiple decoders, probability distributions from the encodings, one probability distribution for one decoder in the multiple decoders;
receive, at a gating mechanism, a hidden state, wherein the hidden state is an output of the first plurality of layers that are shared with the other decoders;
generate, using the gating mechanism, gating probability distributions from the hidden state;
combine, the probability distributions and the gating probability distributions into a probability of the decoder network; and
select, using the probability distribution of the decoder network, a word from a vocabulary or the text input into the summary of the text input.

12. The system of claim 11, wherein to combine the probability distributions and the gating probability distributions, the processor is further configured to:
apply weights associated with the gating probability distributions to the probability distributions associated with multiple decoders; and
generate the probability of the decoder network by adding the weighted probability distributions.

13. The system of claim 11, wherein to combine the probability distributions and the gating probability distributions, the processor is further configured to:
determine, using the gating probability distributions, a probability distribution of the decoder in the decoder network, wherein the probability of the decoder network is the probability of the decoder.

14. The system of claim 11, wherein the processor is further configured to:
receive[ing], at the gating mechanism, user input including weights, the weights indicating contributions of the probability distributions of the multiple decoders; and
wherein to combine the probability distributions and the gating probability distributions further including combine[ing], using the gating mechanism, the probability distributions into the probability of the decoder network according to the weights.

15. The system of claim 11, wherein the first plurality of layers in the decoder are lower layers and the second plurality of layers in the decoder are upper layers.

16. The system of claim 15, wherein to generate the probability distributions from the encodings, the processor is further configured to:
pass the encodings through the lower layers to generate the hidden state[s];
pass the hidden state[s] through the upper layers of the decoder to generate a first probability distribution in the probability distributions; and
pass the hidden state[s] through upper layers of a second decoder in the other decoders to generate a second probability distribution in the probability distributions.

17. The system of claim 16, wherein the processor is further configured to:
pass the encodings through the plurality of lower layers to generate the hidden state[s]; and
pass the hidden state[s] through a feed forward layer and a softmax layer of the gating mechanism to generate the gating probability distributions.

18. A non-transitory computer readable medium storing instructions thereon, that when executed by a processor cause the processor to perform operations, the operations comprising:
receiving, at a summarization model, a text input, the summarization model including an encoder and a decoder network, the decoder network including multiple decoders, wherein a decoder in the multiple decoders includes a plurality of lower layers that [is] are shared with other decoders in the multiple decoders and a set of layers that [is] are not shared with the other decoders;
generating, using the encoder, encodings from the text input;
generating, using the multiple decoders, probability distributions from the encodings, one probability distribution for one decoder in the multiple decoders;
receiving, at a gating mechanism, a hidden state, wherein the hidden state is an output of the plurality of lower layers that are shared with the other decoders;

generating, using the gating mechanism, gating probability distributions from the hidden state;
combining the probability distributions and the gating probability distributions into a probability of the decoder network; and
selecting, using the probability of the decoder network, at least one word in a vocabulary for [the] a summary of the text input.

19. The non-transitory computer readable medium of claim 18, the combining further comprises:
applying weights associated with the gating probability distributions to the probability distributions associated with multiple decoders; and
generating the probability of the decoder network by adding the weighted probability distributions.

20. The non-transitory computer readable medium of claim 18, wherein the combining further comprises:
determining, using the gating probability distributions, a probability distribution of the decoder in the decoder network, wherein the probability of the decoder network is the probability of the decoder.

\* \* \* \* \*